(12) United States Patent
Kwon

(10) Patent No.: US 8,257,765 B2
(45) Date of Patent: Sep. 4, 2012

(54) METHOD OF MANUFACTURING NATURAL EDIBLE SULFUR

(76) Inventor: Man Deog Kwon, Incheon (KR)

(*) Notice: Subject to any disclaimer, the term of this patent is extended or adjusted under 35 U.S.C. 154(b) by 229 days.

(21) Appl. No.: 12/756,742

(22) Filed: Apr. 8, 2010

(65) Prior Publication Data

US 2010/0203224 A1 Aug. 12, 2010

Related U.S. Application Data

(63) Continuation of application No. PCT/KR2010/000453, filed on Jan. 25, 2010.

(30) Foreign Application Priority Data

Jan. 28, 2009 (KR) .................... 10-2009-0006396

(51) Int. Cl.
*A23L 1/304* (2006.01)
(52) U.S. Cl. .......... 426/74; 426/443; 426/481; 426/634; 426/658
(58) Field of Classification Search ............... 426/74, 426/634, 658, 443, 481
See application file for complete search history.

*Primary Examiner* — Helen F Heggestad
(74) *Attorney, Agent, or Firm* — Park & Associates IP Law, P.C.

(57) ABSTRACT

A method of manufacturing natural edible sulfur by filling pig chitterlings with sulfur, treating the chitterlings with licorice and soybeans at temperatures of 100-200 degrees C., removing the licorice and soybeans, and drying the sulfur.

11 Claims, 1 Drawing Sheet

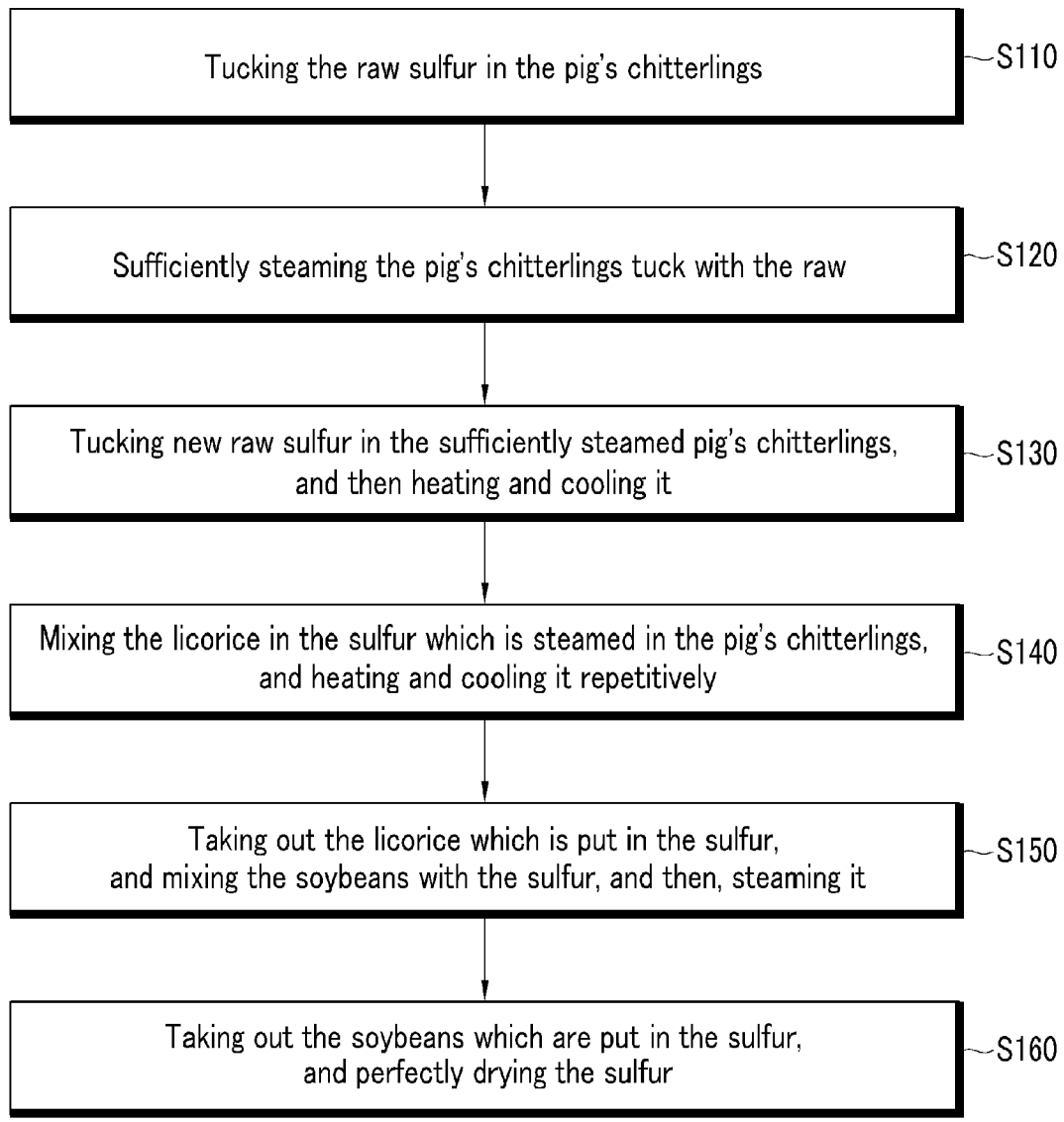

── 1 ──

METHOD OF MANUFACTURING NATURAL EDIBLE SULFUR

REFERENCE TO RELATED APPLICATIONS

This application is a continuation of PCT international application Ser. No. PCT/KR2010/000453 filed on Jan. 25, 2010, which designates the United States and claims priority of KR Application Serial No. 10-2009-0006396, filed Jan. 28, 2009, the entire contents of which are incorporated herein by reference.

FIELD OF THE INVENTION

The present invention relates to a method of manufacturing sulfur, and more particularly, to a method of manufacturing natural edible sulfur enabling to be directly eaten by a person by perfectly removing poison contained in the sulfur.

BACKGROUND OF THE INVENTION

Sulfur has an effect to display malignancy by being deeply penetrated into the cell membrane of a human body, to prevent an aging, to quickly recover a constipation by recovering the movement of a viscera, and to quickly decrease a scar tissue by changing the cross combination process of a collagen composed of a connective tissue since it strongly releases a pain, cools an inflammation and carries substance.

Sulfur has good effect like above, but it has a strong poison, and therefore a person could not eat it directly. A person has indirectly ingested sulfur by eating an animal such as a duck after getting the animal to eat sulfur.

For this, a technique to remove a poison from the sulfur has been developed such that a person can directly eat the sulfur. For one representative example, "Medicine for narcotics and drinking problem and Method of manufacturing the same" of Korean Open Patent No. 1992-003986 is disclosed.

In this prior art, the method of medicine is composed of a step of liquidizing the sulfur by putting raw sulfur in a stainless part and then heating it, a step of heating the liquidized sulfur for 12 hours in 100-800° C. and then putting it in the water, a step of mixing power typed the aconiti lateralis preperata Radix, Oriental Aconite, the natural length mica and the Alum in the sulfur, a step of heating the mixed sulfur for 20 hours in 100-800° C. and then putting it in the water, a step of drying the sulfur, and a step of mixing licorice and ginseng.

However, the sulfur obtained by this method was not efficiently removed its poison as much as a person can the sulfur directly.

As another representative example, "Method of sulfur for dietary supplement" of Korean Registered Patent No. 10-0404927 is disclosed.

In this prior art, the method is composed of a step of obtaining white nontoxic sulfur coagulua by repetitively heating yellow sulfur in 500~700° C. and cooling it, a step of adding the calcium carbonate to the obtained sulfur and heating in 120~180° C. to liquidize, and a step of adding the nitric acid therein and then neutralizing it.

However, the sulfur obtained by this method was not guaranteed to safely eat directly since it contains the nitric acid and the calcium carbonate which is chemical.

SUMMARY OF THE INVENTION

The present invention is created to solve a problem of the above-mentioned prior art, and accordingly the object of the present invention provides a method of manufacturing natural edible sulfur enabling to perfectly remove the poison form the sulfur only using the natural material such as the pig's chitterlings, the licorice, the soybeans and the wheat flour such that a person can it directly.

In order to achieve the above-described object, the present invention provides a method of manufacturing natural edible sulfur, the method comprising a first step of tucking the raw sulfur in the pig's chitterlings; a second step of sufficiently steaming the pig's chitterlings tuck with the raw sulfur for 2~3 hours in 100° C.~120° C.; a third step of tucking new raw sulfur in the sufficiently steamed pig's chitterlings with the same ratio of the first step, and then heating and cooling the pig's chitterlings repetitively for 2~3 hours in 100° C.~120° C. in four times; a fourth step of mixing the licorice in the sulfur which is steamed in the pig's chitterlings in the third step, and heating and cooling the sulfur mixed with the licorice repetitively for 2~3 hours in 100° C.~120° C.; a fifth step of taking out the licorice which is put in the sulfur in the fourth step, and mixing the soybeans with the sulfur, and then, steaming the sulfur mixed with the soybeans for 2~3 hours in 100° C.~120° C.; and a sixth step of taking out the soybeans which are put in the sulfur in the fifth step, and perfectly drying the sulfur 2 hours in 100° C.~120° C.

The method further comprises a seventh step of processing the dried sulfur to be powder or a tablet after the sixth step.

In the first step, the weight ratio of the raw sulfur and the pig's chitterlings is preferable to be 1:2, and in the third step, the heating and cooling is repetitively in four times, and in the third step, the weight ratio of the sulfur and the licorice is preferable to be 5:1.

Herein, the heating and cooling is repetitively in two times, the weight ratio of the sulfur and the soybeans is preferable to be 2:1, and the steaming is done one time.

According to the method of manufacturing natural edible sulfur of the present invention, a side effect raised by chemical substances in the prior art using artificial materials can't be happened because the poison contained in the sulfur is perfectly removed by the natural materials.

BRIEF DESCRIPTION OF THE DRAWINGS

The above and other objects and advantages of the present invention will become readily apparent by reference to the following detailed description when considered in conjunction with the accompanying drawing wherein:

FIG. 1 is a flow chart schematically showing the method of manufacturing natural edible sulfur of the present invention in steps.

DETAILED DESCRIPTION OF THE INVENTION

Hereinafter, the method of manufacturing natural edible sulfur according to preferred embodiment of the present invention will be described in detail with reference to the accompanying drawings.

The method of manufacturing natural edible sulfur of the present invention prepares 20 kg of raw sulfur, 40 kg of pig's chitterlings, 4 kg of licorice and 10 kg of soybeans as original materials.

A first step: In this step, the raw sulfur is tuck into the pig's chitterlings. At this time, the weight ratio of the raw sulfur and the pig's chitterlings is preferable to be 1:2. (S110)

A second step: In this step, the pig's chitterlings tuck with the raw sulfur is sufficiently steamed for 2~3 hours in 100° C.~120° C.

A third step: In this step, new raw sulfur is tuck into the sufficiently steamed pig's chitterlings with the same ratio of the first step, and then the pig's chitterlings is heated and cooled repetitively for 2~3 hours in 100° C.~120° C. in four times. (S130)

A fourth step: In this step, the licorice is mixed in the sulfur which is steamed in the pig's chitterlings in the third step, and the sulfur mixed with the licorice is heated and cooled repetitively for 2~3 hours in 100° C.~120° C. in two times. At this time, the weight ratio of the sulfur and the licorice is preferable to be 5:1. (S140)

A fifth step: In this step, the licorice which is put in the sulfur in the fourth step is taken out, and the soybeans are mixed with the sulfur. And then, the sulfur mixed with the soybeans is steamed for 2~3 hours in 100° C.~120° C. in one time. At this time, the weight ratio of the sulfur and the soybeans is preferable to be 2:1. (S150)

A sixth step: In this step, the soybeans which are put in the sulfur in the fifth step are taken out, and the sulfur is perfectly dried for 2 hours in 100° C.~120° C. (S160)

A seventh step: In this step, the dried sulfur is processed to be powder or a tablet. (S170)

According to the present invention, the edible sulfur can be easily widely spread with lower cost, which causes every one who needs it to take without a burden for expense since the sulfur which is very good for human body can be made with lower cost with the natural materials and it can be supplied in powder or a tablet.

Although the preferred embodiment of the present invention has been described, it is understood that the present invention should not be limited to this preferred embodiment but various changes and modifications can be made by one skilled in the art within the sprit and scope of the present invention aimed.

What is claimed is:

1. A method of manufacturing natural edible sulfur, the method comprising:
   a first step of filling pig chitterlings with raw sulfur;
   a second step of sufficiently steaming the pig chitterlings filled with the raw sulfur for 2-3 hours at 100°-120° C.;
   a third step of filling the steamed pig chitterlings in the second step with additional raw sulfur, and then heating and cooling the pig chitterlings for 2~3 hours at 100° C.~120° C.;
   a fourth step of mixing licorice with the sulfur which is steamed in the pig chitterlings, in the third step, and heating and cooling the sulfur mixed with the licorice repeatedly for 2~3 hours at 100° C.~120° C.;
   a fifth step of removing the licorice which is mixed with the sulfur in the fourth step and mixing soybeans with the sulfur, and then steaming the sulfur mixed with the soybeans for 2-3 hours at 100° C.~120° C.; and
   a sixth step of removing the soybeans which are mixed with the sulfur in the fifth step, and drying the sulfur for 2 hours at 100° C.~120° C.

2. The method of manufacturing natural edible sulfur according to claim 1, wherein, in the first step, the weight ratio of the raw sulfur and the pig chitterlings is about 1:2.

3. The method of manufacturing natural edible sulfur according to claim 1, wherein, in the third step, the steps of heating and cooling are repeated four times.

4. The method of manufacturing natural edible sulfur according to claim 1, wherein, in the third step, the weight ratio of the sulfur to licorice is about 5:1.

5. The method of manufacturing natural edible sulfur according to claim 1, wherein, in the fifth step, the weight ratio of the sulfur to soybeans is about 2:1.

6. The method of manufacturing natural edible sulfur according to claim 5, wherein the steaming is done once in the $5^{th}$ step.

7. The method of manufacturing natural edible sulfur according to claim 1, further comprising a seventh step of processing dried sulfur into powder or a tablet after the sixth step.

8. The method of manufacturing natural edible sulfur according to claim 7, wherein, in the third step, the weight ratio of the sulfur to licorice is about 5:1.

9. The method of manufacturing natural edible sulfur according to claim 8, wherein the steps of heating and cooling are repeated four times in step 3.

10. The method of manufacturing natural edible sulfur according to claim 7, in the fifth step, the weight ratio of the sulfur to soybeans is about 2:1.

11. The method of manufacturing natural edible sulfur according to claim 10, wherein in step 5, the steaming is done once.

* * * * *